(12) United States Patent
Larsson et al.

(10) Patent No.: US 6,367,868 B1
(45) Date of Patent: Apr. 9, 2002

(54) BOX MEMBER FOR A VEHICLE

(75) Inventors: Johnny K Larsson, Gothenburg; Lars Hammarström, Torslanda, both of (SE)

(73) Assignee: AB Volvo, Göteborg (SE)

( * ) Notice: Subject to any disclaimer, the term of this patent is extended or adjusted under 35 U.S.C. 154(b) by 0 days.

(21) Appl. No.: 09/580,724

(22) Filed: May 30, 2000

Related U.S. Application Data

(63) Continuation of application No. 09/051,753, filed as application No. PCT/SE96/01321 on Oct. 17, 1996, now abandoned.

(30) Foreign Application Priority Data

Oct. 20, 1995 (SE) .............................................. 9503700

(51) Int. Cl.⁷ .................................................. B60J 7/00
(52) U.S. Cl. ........................ 296/188; 296/205; 296/189
(58) Field of Search .............................. 296/188, 189, 296/194, 196, 205, 204; 280/784

(56) References Cited

U.S. PATENT DOCUMENTS

| | | |
|---|---|---|
| 4,050,537 A | 9/1977 | Bez |
| 4,194,763 A | 3/1980 | Reidelbach et al. |
| 5,314,229 A | 5/1994 | Matuzawa et al. |
| 5,951,097 A | 9/1999 | Esposito et al. |

FOREIGN PATENT DOCUMENTS

| | | |
|---|---|---|
| DE | 2459518 | 7/1976 |
| DE | 3826958 | 3/1989 |
| EP | 0278912 | 8/1988 |
| JP | 0015017 | 2/1977 |
| JP | 0017221 | 2/1979 |
| JP | 0124974 | 7/1984 |

*Primary Examiner*—Joseph D. Pape
*Assistant Examiner*—Jason Morrow
(74) *Attorney, Agent, or Firm*—Kilpatrick Stockton LLP

(57) ABSTRACT

A box-shaped beam for a vehicle, exemplarily a front lateral member (2), with a portion (6) oriented in the longitudinal direction of the vehicle. The portion (6) has, at a distance from a front end, stiffener plates (8) glued to opposite sides (9, 10) of the beam. The glue (11) is of a hard and brittle type which allows the plates to be split off after a certain deformation of the beam occurs so that the section with the plates is rendered less stiff.

8 Claims, 2 Drawing Sheets

BOX MEMBER FOR A VEHICLE

RELATED PATENT APPLICATIONS

This is a continuation patent application of U.S. patent application Ser. No. 09/051,753 filed Jul. 21, 1998 abandoned which is a National Stage United States Patent Application of International Patent Application PCT/SE96/01321 having an International Filing Date of Oct. 17, 1996 and that designates the United States. The full disclosure of said applications, in their entireties, are hereby expressly incorporated by reference into the present application.

TECHNICAL FIELD

The present invention relates to a beam in a vehicle comprising a box-shaped member made of bent sheet metal and having a greater length than both width and height. The box-shaped member also has a portion oriented in the longitudinal direction of the vehicle and that has, at a distance from one end, an area made so that the stiffness of the beam in the longitudinal direction is suddenly reduced after the beam has been deformed a pre-determined distance beginning from said end.

BACKGROUND OF THE INVENTION

Box beams appear in a number of different applications in automobiles. As an example, such beams are utilized as front lateral members in passenger car chassis and are thus components, the design of which crucially affects the collision safety of the automobile. One method of achieving high collision safety through crash control is to force, as much as possible, the elements in the structure to be deformed in the most energy-absorbing manner, which is progressive crushing or fold formation. Less energy-absorbing modes, such as rigid body rotation or bending, should thus be avoided.

From the point of view of crash safety, the ideal situation would be to allow the volume represented by the forward portion of the car to consist of a large number of cells, each having a large energy-absorbing capacity regardless of from which direction the car is struck. Such solutions, however, have not been able to be employed in mass production for a number of reasons.

Test vehicles have been manufactured in which foam plastic-filled box beams have been used to achieve controlled deformation. Such vehicles have, however, never been produced in large volumes. The reasons are many, but the most important are the high costs connected with complicated manufacturing processes and the effect on the environment of harmful chemicals in the foam used.

Normally, the beam member system in a vehicle is regarded as a passive security system where it is primarily the geometric shape of the box beams which, through their energy-absorbing capacity, determine the collision safety. It is, however, known to arrange in a vehicle an "active" beam system; that is, a system where a collision triggers an activity which makes the beam system act in a certain manner beyond its normal mechanical limitations. Such an active beam system is shown, for example, in U.S. Pat. No. 4,050,537. In the '537 patent, an explosive charge is used in the event of a collision to change a cross section of a box beam in such a manner that the beam's stiffness, and thus its energy-absorbing capacity, increases.

In view of the above described deficiencies associated with known box beam designs for vehicles, the present invention has been developed. These enhancements and benefits are described in greater detail hereinbelow with respect to several alternative embodiments of the present invention.

DISCLOSURE OF THE INVENTION

The present invention in its several disclosed embodiments alleviates the drawbacks described above with respect to conventionally designed vehicular box beams and incorporates several additionally beneficial features.

The purpose of the present invention is, in general, to achieve a simple and inexpensive active beam arrangement of the type described by way of introduction which avoids less energy-absorbing modes such as rigid rotation and bending.

This is achieved, according to the invention, by virtue of the fact that the box-shaped member is stiffened in relevant areas by means of stiffeners fixed to the box profile. The stiffeners are arranged to split off when the beam has been deformed a predetermined distance. The stiffeners can be simple plates which are glued to the beam with an adhesive which provides a hard and brittle glue joint; for example, an epoxy glue. If the areas under the plates are, for example, stamped, folded, perforated or of smaller thickness than the rest of the beam plate, a substantial reduction in the stiffness of the beam can be obtained in these areas when the glue joint breaks and the plates are shed.

A beam, arranged according to the invention, is thus considered an active beam. By studying the deformation of a passive beam after a collision, it is possible to determine where the transition occurred between upsetting or fold formation, and buckling of the entire beam. By actively softening the beam in this failure area, buckling can be avoided during deformation. As a result of the softening, the area in which fold formation occurs is extended also across the softened area up to the area behind it, which can be stiffer.

The beneficial effects described above apply generally to the exemplary systems and methods for improving box beam performance. The specifics through which these benefits are enabled will be described in detail hereinbelow.

BRIEF DESCRIPTION OF THE DRAWINGS

The invention will now be described in greater detail in the following way, by example only, and with reference to the attached drawings, in which.

MODE(S) FOR CARRYING OUT THE INVENTION

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components or processes. Therefore, specific structural and functional details disclosed herein are not to be interpreted as limiting, but merely as a basis for the claims and as a representative basis for teaching one skilled in the art to variously employ the present invention.

Figure 1:
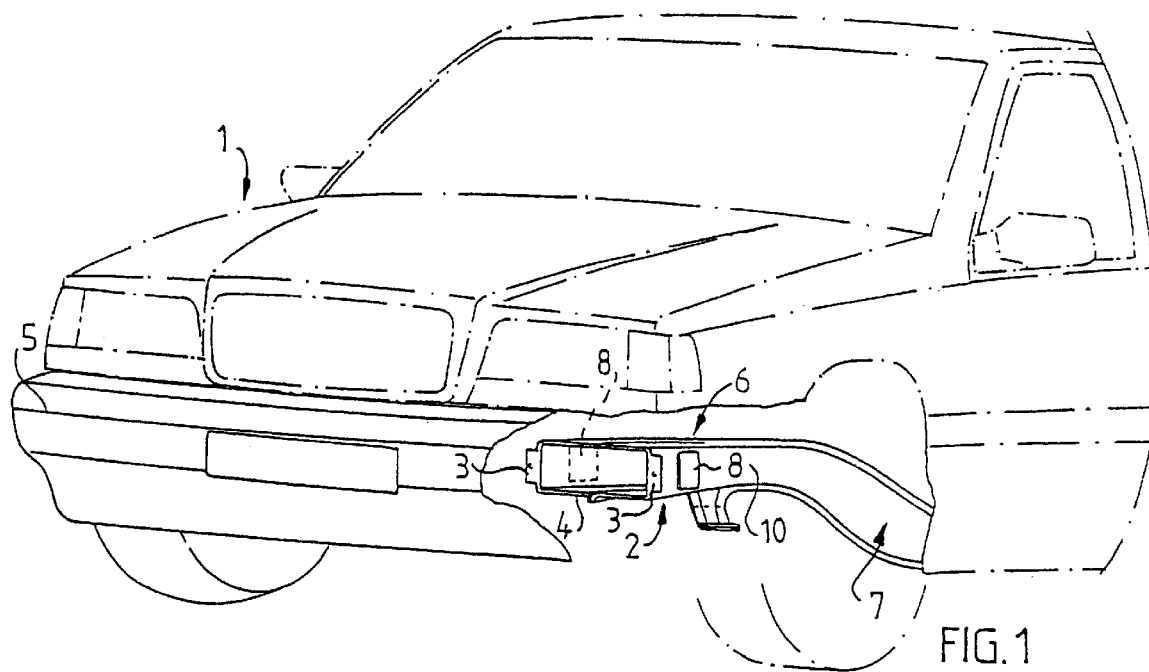
FIG. 1 shows a perspective view of a first embodiment of a forward lateral beam, constructed according to the invention, in a schematically represented passenger car.
Figure 2A:
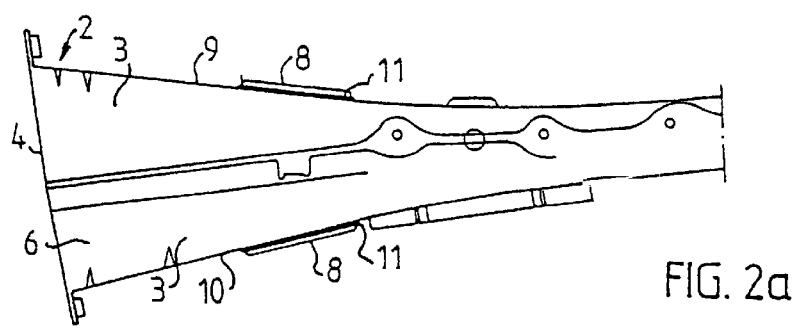
FIGS. 2a, 2b and 2c show plan views of a portion of the beam in FIG. 1 in different stages of deformation.
Figure 2B:
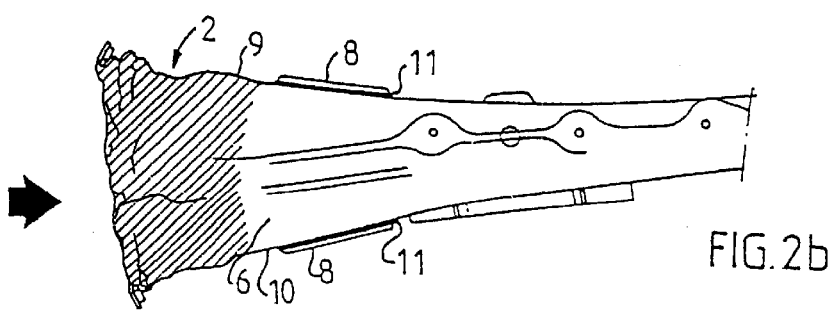
Figure 2C:
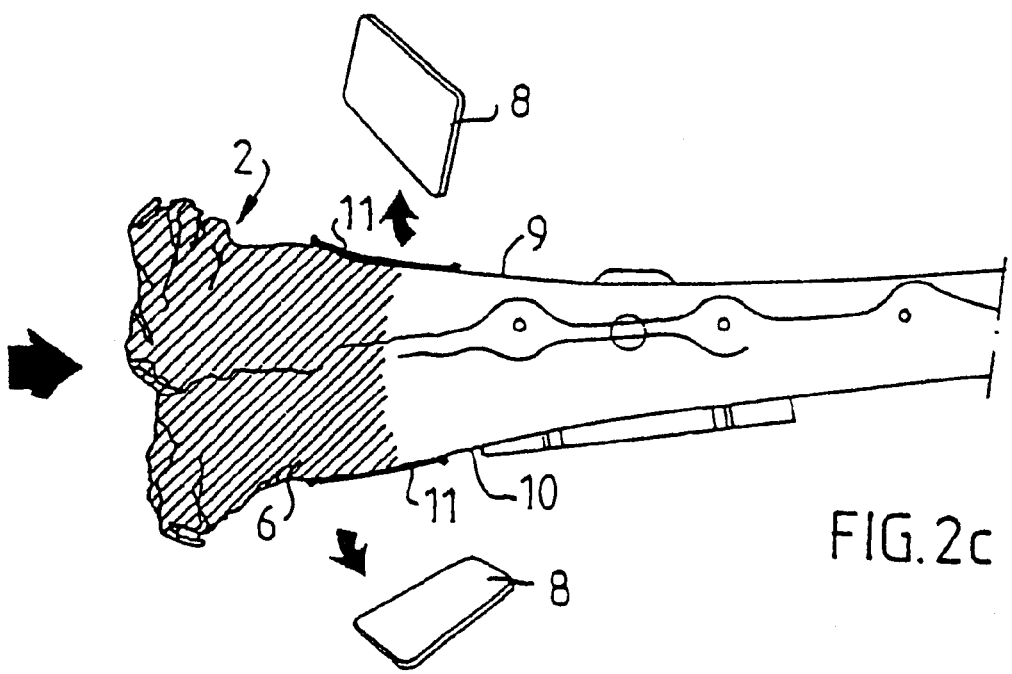

Referring to FIG. 1, the reference numeral 1 designates a car body of the so-called self-supporting type. A box beam, generally designated by the reference numeral 2, is one of two lateral beams or members fixed symmetrically relative to the longitudinal center plane of the vehicle. The beam 2 consists of two U-profiles 3 that are joined to each other to form a rectangular box profile. The beam 2 shown and its general construction and function are well known and need not be here, described in more detail. It should suffice to say, however, that in one car model available on the market, the lateral beams serve as supports for an intermediate frame which in turn supports the engine. As can be seen in FIGS. 2a–c, the beam 2 flares in the form of a horn. Its broader end 4, as seen at the left in FIGS. 2a–c, is joined to the front bumper 5 of the vehicle a shown in FIG. 1. From its straight front portion 6, extending in the longitudinal direction of the vehicle, there is a transition to a curved rear portion 7 that is joined to the bottom plate of the vehicle.

In the embodiment shown in FIGS. 1 and 2a–c, two rectangular metal plates 8 are glued securely to opposite vertical sides 9,10 of the beam 2 at a distance from the broad end 4. The plates 8 are arranged at a section of the beam 2 which must be temporarily prevented from bending or buckling. The function of the plates 8 is in general to support the structure in front of them so that it will be used effectively for energy-absorption by optimizing the crushing process. When the deformation process has reached the section with the plates 8, the plates 8 are split off by the movement as shown in FIG. 2c.

The shading in FIGS. 2b and 2c marks the extent in the beam 2 of deformation. The primary function of the plates 8 is to increase the stability of the beam portion which must be temporarily prevented from buckling by increasing the lateral stiffness of the beam sides 9,10. The glue must be able to transmit shear stresses for smaller lateral movements but, when there is a greater deformation, it should allow a brittle break. Suitable types of glue are epoxy glue; for example, the type which is sometimes used to reinforce door arches. The thickness of the glue joint 11 can be as much as a couple of millimeters. The components and the glue joint are dimensioned so that the force level in the example shown, when the joint is loosened, is ca 80–100 kN. The degree of softening at shedding of the plates 8 can be controlled with various types of "weakenings" of the beam 2 in the area of the plates 8; for example, by thinner sheet metal in the beam, by perforations or by stamping.

Figure 3:
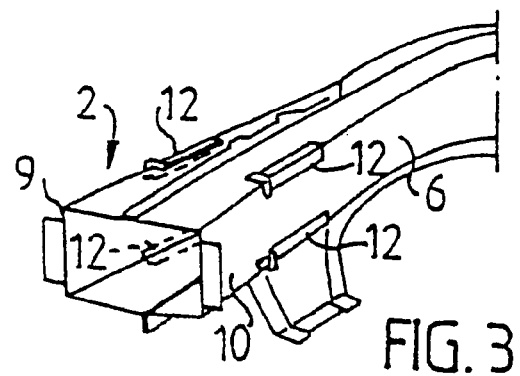
FIG. 3 shows a perspective view of a lateral beam corresponding in orientation to the beam in FIG. 1, but illustrating a second embodiment of the invention.

FIG. 3 shows a second embodiment of a beam 2 constructed according to the present invention. Here, the two plates 8 have been replaced by four angle irons 12 which are glued securely over the corners of the beam 2. In this example, the beam 2 is exemplarily weakened by bores in the corners, but these bores are covered by the angle irons 12 in the illustration and therefore not visible. Otherwise, the functional principle using the angle irons 12 is the same as in the preceding example.

It should be appreciated that even though the demonstrated embodiments of the present invention have been described in detail with reference to the accompanying drawings, the invention is not to be limited to these specific embodiments and various changes or modifications can be made by someone skilled in the art, without deviating from the scope defined by the following patent claims.

What is claimed and desired to be secured by Letters Patent is as follows:

1. A beam for use in a vehicle, comprising a box-shaped member made of bent sheet metal, having a greater length than both width and height, and having a portion which is oriented in the longitudinal direction of the vehicle and which has, at a distance from one end, an area which is made so that its stiffness in the longitudinal direction of the beam is suddenly reduced after the beam has been deformed a pre-determined distance beginning from said one end, wherein the box-shaped member is stiffened in said area by stiffeners fixed to the box-shaped member, said stiffeners being arranged to split off when the beam has been deformed said pre-determined distance.

2. The beam according to claim 1, wherein the stiffeners are glued to the outer surface of the box-shaped member by an adhesive which provides a hard and brittle glue joint.

3. The beam according to claim 2, wherein the adhesive is an epoxy adhesive.

4. The beam according to claim 2, wherein the box-shaped member, the stiffeners and the adhesive for fixing the stiffeners to the box-shaped member are adapted to each other so that the force level when the stiffeners are split off away from the box-shaped member is about 80–100 kN.

5. The beam according to claim 1, wherein the box-shaped member has a rectangular profile and the stiffeners are in the form of plates fixed at least on two opposite sides of the profile.

6. The beam according to claim 1, wherein the box-shaped member has a rectangular profile and the stiffeners are in the form of angle irons fixed over the corners of the profile.

7. The beam according to claim 1, wherein the box-shaped member, in areas overlapped by the stiffeners, has reduced stiffness in relation to adjacent areas of the box-shaped member.

8. The beam according to claim 1, wherein the box-shaped member is a portion of a front lateral beam in a passenger car chassis.

* * * * *